(12) United States Patent
DiValentin et al.

(10) Patent No.: US 10,476,896 B2
(45) Date of Patent: Nov. 12, 2019

(54) MALICIOUS THREAT DETECTION THROUGH TIME SERIES GRAPH ANALYSIS

(71) Applicant: Accenture Global Solutions Limited, Dublin (IE)

(72) Inventors: Louis William DiValentin, Fairfax, VA (US); Joshua Patterson, Baltimore, MD (US); Keith Kraus, Arlington, VA (US); Robin Lynn Burkett, Alexandria, VA (US); Michael Evan Wendt, Alexandria, VA (US)

(73) Assignee: Accenture Global Solutions Limited, Dublin (IE)

( * ) Notice: Subject to any disclaimer, the term of this patent is extended or adjusted under 35 U.S.C. 154(b) by 228 days.

(21) Appl. No.: 15/264,234

(22) Filed: Sep. 13, 2016

(65) Prior Publication Data

US 2018/0077175 A1 Mar. 15, 2018

(51) Int. Cl.
*G06F 21/55* (2013.01)
*G06F 16/2458* (2019.01)
(Continued)

(52) U.S. Cl.
CPC ...... *H04L 63/1416* (2013.01); *G06F 16/2477* (2019.01); *G06F 16/254* (2019.01);
(Continued)

(58) Field of Classification Search
CPC ........................... H04L 63/1416; G06F 16/254
(Continued)

(56) References Cited

U.S. PATENT DOCUMENTS

| 6,735,548 B1 | 5/2004 | Huang et al. |
| 8,346,921 B1 * | 1/2013 | Goodspeed ............ G06Q 30/02 709/200 |

(Continued)

FOREIGN PATENT DOCUMENTS

| JP | 2006/107179 | 4/2006 |
| WO | 2013/184206 | 12/2013 |

OTHER PUBLICATIONS

AU Office Action in Australian Appln. No. 2017-221858, dated Sep. 5, 2018, 7 pages.

(Continued)

*Primary Examiner* — Jason K Gee
*Assistant Examiner* — Dereena T Cattungal
(74) *Attorney, Agent, or Firm* — Fish & Richardson P.C.

(57) ABSTRACT

Malicious threat detection through time-series graph analysis, in which a data analysis device receives a data file comprising multiple log data entries. The log data entries include parameters associated with a computer network event in a computing network. The data analysis device produces a graphical model of the computing network based on at least one parameter included in the log data. The data analysis device also identifies a parameter associated with a node of the computer network represented by the graphical model, and performs a time-series analysis on the parameter. The data analysis device further determines, based on the time-series analysis on the parameter, at least one of an anomalous event associated with the computing network or a malicious event associated with the computing network.

20 Claims, 3 Drawing Sheets

(51) Int. Cl.
   *H04L 29/06* (2006.01)
   *G06F 16/25* (2019.01)
(52) U.S. Cl.
   CPC ........ *G06F 21/552* (2013.01); *H04L 63/1425* (2013.01); *H04L 63/1433* (2013.01); *G06F 2201/81* (2013.01); *G06F 2201/835* (2013.01); *G06F 2201/86* (2013.01)
(58) Field of Classification Search
   USPC .......................................................... 726/23
   See application file for complete search history.

(56) References Cited

U.S. PATENT DOCUMENTS

| | | | |
|---|---|---|---|
| 8,674,993 | B1 | 3/2014 | Fleming et al. |
| 8,762,298 | B1* | 6/2014 | Ranjan ............... G06N 5/02 706/12 |
| 8,881,288 | B1* | 11/2014 | Levy .................. G06F 21/577 709/225 |
| 9,231,962 | B1* | 1/2016 | Yen ................... H04L 63/1408 |
| 2008/0109730 | A1* | 5/2008 | Coffman ............ G06Q 30/02 715/733 |
| 2009/0097418 | A1 | 4/2009 | Castillo et al. |
| 2010/0145771 | A1* | 6/2010 | Fligler ................ G06Q 10/10 705/319 |
| 2012/0303573 | A1* | 11/2012 | Pan ...................... G06N 7/005 706/52 |
| 2013/0219503 | A1 | 8/2013 | Amnon et al. |
| 2014/0032506 | A1* | 1/2014 | Hoey ................. G06F 17/30303 707/691 |
| 2015/0236935 | A1* | 8/2015 | Bassett .............. H04L 63/1408 709/224 |
| 2016/0036707 | A1 | 2/2016 | Mestery et al. |
| 2016/0048681 | A1 | 2/2016 | Fang et al. |
| 2016/0117358 | A1 | 4/2016 | Schmid et al. |
| 2016/0342628 | A1 | 11/2016 | Van Rest et al. |
| 2017/0006135 | A1* | 1/2017 | Siebel .................... H04L 67/02 |
| 2017/0083386 | A1* | 3/2017 | Wing ..................... G06F 9/542 |
| 2017/0126712 | A1* | 5/2017 | Crabtree ............ H04L 63/1425 |
| 2017/0279827 | A1* | 9/2017 | Savalle ............... H04L 63/1425 |
| 2017/0318034 | A1* | 11/2017 | Holland .............. H04L 63/1416 |
| 2018/0069885 | A1 | 3/2018 | Petterson |

OTHER PUBLICATIONS

AU Office Action in Australian Appln. No. 2017-224993, dated Sep. 7, 2018, 2 pages.

'conferences.oreilly.com' [online] "Streaming cybersecurity into Graph: Accelerating Data into Datastax Graph and Blazegraph," Sep. 29, 2016, [retrieved on Jul. 23, 2018] Retrieved from Internet: URL<https://conferences.oreilly.com/strata/strata-ny-2016/public/schedule/detail/52168> 7 pages.

'www.backhat.com' [online] "Blackhat USA 2016" Jul. 30-Aug. 4, 2016 [retrieved on Jul. 23, 2018] Retrieved from Internet: URL<https://www.blackhat.com/us-16/arsenal.html#accelerating-cyber-hunting-project-asgard> 45 pages.

First Examination Report for Application No. 2017221858, dated Apr. 16, 2018, 6 pages.

First Examination Report for Application No. 2017224993, dated Apr. 17, 2018, 3 pages.

Extended European Search Report in European Application No. 17188295.4, dated Nov. 7, 2017, 7 pages.

Extended European Search Report in European Application No. 17188522.1, dated Nov. 9, 2017, 7 pages.

JP Office Action in Japanese Appln. No. 2017-169649, dated Dec. 18, 2018, 9 pages (machine translation).

* cited by examiner

MALICIOUS THREAT DETECTION THROUGH TIME SERIES GRAPH ANALYSIS

FIELD

The present specification is related to detection of malicious threats through analysis of one or more time series graphs.

BACKGROUND

Computer networks include multiple computing assets that enable individuals or users to access shared resources including a variety of digital content accessible by the internet. A computer network can be a set of computers connected together to form one or more nodes within a personal area network, a local/virtual area network, a wide area network or any other type of network architecture associated with a collection of computing devices. Access to the internet and to other web resources that are external to a particular network presents a variety of cyber security challenges. As such, computing assets with a computer network can be susceptible to data breaches or attacks based on malicious users gaining unauthorized access to one or more assets with the network.

SUMMARY

The subject matter described in this specification relates to the structuring of log data as a graph and the application of graph analytics to the structured log data to enrich nodes based on centrality and importance measures. The subject matter described includes application of time-series analysis and other related analytics measures to detect sudden and unexpected shifts or changes in indicated importance of a particular node within a computer network. When evaluating data flow characteristics within a computer network, data traffic associated with a particular node will typically change gradually as opposed to suddenly. This is because computer networks are generally stable with regard to the relative importance of nodes. Hence, indications of sudden or abrupt shifts in nominal traffic flow patterns are usually rare and can serve as an indicator of potential malicious activity occurring within the network.

Sudden shifts in nodal activity will be indicative of behavior changes associated with a computing asset or node that is worthy of investigation and will trigger the interest of operators working within a network/security operations center (NOC/SOC). An asset compromised by a malicious actor that has gained unauthorized access to an organization's computer network will typically show a rapid rise in node importance based, in part, on an abrupt change in data flow characteristics of the node. This change in data flow characteristics (e.g., an importance measure) may be associated with reconnaissance activities and/or attempts, by a malicious user, to laterally move or exfiltrate data from the network. Hence, the teachings described in this specification, include a system and method for enriching each node or asset within a computer network with enhanced importance and/or centrality measures. The subject matter described further includes robust data analysis methods that can be applied to each node to enhance the probability of reliably detecting sudden shifts in the importance centrality measures associated with a particular node. Accordingly, more effective and timely detection of cyber threats are achieved through application of the teachings described herein.

An innovative aspect of the subject matter described in this specification can be embodied in a computer-implemented method. The method includes receiving, by a data analysis device, a data file comprising multiple log data entries, the log data entries including parameters associated with a computer network event in a computing network; and producing, by the data analysis device, a graphical model of the computing network based on at least one parameter included in the log data entries. The method further includes identifying, by the data analysis device, a parameter associated with the graphical model, the parameter also being associated with a node of the computing network; performing, by the data analysis device, a time-series analysis on the parameter; and determining, based on the time-series analysis on the parameter, at least one of an anomalous event associated with the computing network or a malicious event associated with the computing network.

These and other implementations can each optionally include one or more of the following features. For example, in some implementations, producing the graphical model of the computing network comprises analyzing, by a processor of the data analysis device, log data entries using one or more graph analytic (GA) measures to produce a first set of GA metrics. In one aspect, the GA measures comprise at least one of a PageRank measure, a between-ness centrality measure, a triangle count measure, or one or more graph analytic measures configured to analyze a reoccurring characteristic of the at least one parameter. In another aspect, the method further comprises, performing, by the data analysis device, a periodic log data update that comprises point-in-time partitioning by, for each update of the periodic log data update, receiving a past time window of log data entries associated with the graphical model and storing, in a data storage unit of the data analysis device, the past time window of log data entries. In yet another aspect, the method further comprises, analyzing, by the processor, the past time window of log data entries associated with the graphical model to produce a subsequent set of GA metrics, wherein the first set of GA metrics and subsequent set of GA metrics each comprise at least one parameter on which time-series analysis is performed. In yet another aspect, the method further comprises, storing, in the data storage unit, the graphical model of the data as at least one of an adjacency matrix and a compressed sparse matrix.

In some implementations, performing time-series analysis on the parameter includes analyzing, by the data analysis device, the node of the computing network to detect a change in an attribute of the node that exceeds a predetermined threshold, and wherein the change occurs between a first time period and a second time period that is later in time than the first time period. In other implementations, the method further comprises extracting, by the data analysis device, the parameters associated with the computer network event and preparing at least one parameter to be loaded into a data storage unit of the data analysis device; and wherein extracting and preparing occur in response to a processor of the data analysis device executing an instruction stored in the data storage unit, wherein the instruction comprises an extract, transform, load (ETL) data processing function.

In some implementations, the parameters associated with the computer network event included in the log data entries comprise at least one of a network event type, a source identifier, or a destination identifier, and wherein the node comprises one of a computing asset or a user of a computing asset. In other implementations, performing the time-series analysis comprises performing at least a part of the time-series analysis using one of a graphics processing unit (GPU), a central processing unit (CPU), an application specific integrated circuit, or a programmable logic device.

Another innovative aspect of the subject matter described in this specification can be embodied in an electronic system comprising one or more processing devices; and one or more machine-readable storage devices storing instructions that are executable by the one or more processing devices to perform operations. The operations comprising receiving a data file comprising multiple log data entries, the log data entries including parameters associated with a computer network event in a computing network; and producing a graphical model of the computing network based on at least one parameter included in the log data entries. The operations further include identifying a parameter associated with the graphical model, the parameter also being associated with the node of a computing network; performing a time-series analysis on the parameter; and determining, based on the time-series analysis on the parameter, at least one of an anomalous event associated with the computing network or a malicious event associated with the computing network.

These and other implementations can each optionally include one or more of the following features. For example, in some implementations, producing the graphical model of the computing network comprises analyzing, by a graphics processor of the electronic system, log data entries using one or more graph analytic (GA) measures to produce a first set of GA metrics. In one aspect, the GA measures comprise at least one of a PageRank measure, a between-ness centrality measure, a triangle count measure, or one or more graph analytic measures configured to analyze a reoccurring characteristic of the at least one parameter. In another aspect, operations performed by the electronic system further comprises performing a periodic log data update that comprises point-in-time partitioning by, for each update of the periodic log data update, receiving a past time window of log data entries associated with the graphical model and storing, in a storage device of the electronic system, the past time window of log data entries. In yet another aspect, operations performed by the electronic system further comprises, analyzing, by the graphics processor, the past time window of log data entries associated with the graphical model to produce a subsequent set of GA metrics, wherein the first set of GA metrics and subsequent set of GA metrics each comprise at least one parameter on which time-series analysis is performed.

In some implementations, operations performed by the electronic system further comprises extracting the parameters associated with the computer network event and preparing at least one parameter to be loaded into a storage device of the electronic system; and wherein extracting and preparing occur in response to a processor of the data analysis device executing an instruction stored in the data storage unit, wherein the instruction comprises an extract, transform, load (ETL) data processing function. In other implementations, performing time-series analysis on the parameter includes analyzing, by a graphics processor of the electronic system, the node of the computing network to detect a change in an attribute of the node that exceeds a predetermined threshold, and wherein the change occurs between a first time period and a second time period that is later in time than the first time period. In other implementations, the time-series analysis methods comprise at least one of a time-series regression method, an auto-regressive method, a control-chart based method, or a markov jump method.

Yet another innovative aspect of the subject matter described in this specification can be embodied in a non-transitory computer storage unit disposed in a data analysis device encoded with a computer program. The program comprising instructions that when executed by one or more processing units cause the one or more processing units to perform operations comprising, receiving a data file comprising multiple log data entries, the log data entries including parameters associated with a computer network event in a computing network; and producing a graphical model of the computing network based on at least one parameter included in the log data entries. The operations further include identifying a parameter associated with the graphical model, the parameter also being associated with a node of the computing network; performing a time-series analysis on the parameter; and determining, based on the time-series analysis on the parameter, at least one of an anomalous event associated with the computing network or a malicious event associated with the computing network.

These and other implementations can each optionally include one or more of the following features. For example, in some implementations, producing the graphical model of the computing network comprises analyzing, by a processing unit of the data analysis device, log data entries using one or more graph analytic (GA) measures to produce a first set of GA metrics.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and methods that include retrieval of multiple log files from a variety of network protection tools and conversion of the log data by a data analysis device. The data analysis device includes one or more modules that apply graph and time-series based analytical measures to the retrieved data to enable detection of malicious threats to a computer network. Application of the graph analysis and time-series analysis measures enable visualization of the retrieved log data as a graphical network having one or more nodes and edges.

In an example implementation, graph analysis measures include: 1) collection and storage, at periodic time intervals, of network event data indicated by the log file; 2) application of graph analytic measures to network event data in response to collection and storage; and 3) updating graph analytic calculations at a predetermined rate for each time interval in which collection and storage occurs. Prior to time-series analysis, data enrichment, by the analysis device, occurs when certain parameters associated with network event data are parsed or extracted. Time-series analysis measures are applied to the extracted parameters to compare and contrast the parameter values to a baseline or threshold value to indicate sudden or abrupt shifts in network activity of a particular node. Malicious threat detection is enabled based on any sudden and unexpected shifts in network activity. In some implementations, detection of an anomalous or abnormal computer network event can provide an indication that gives rise to a malicious threat.

Figure 1:
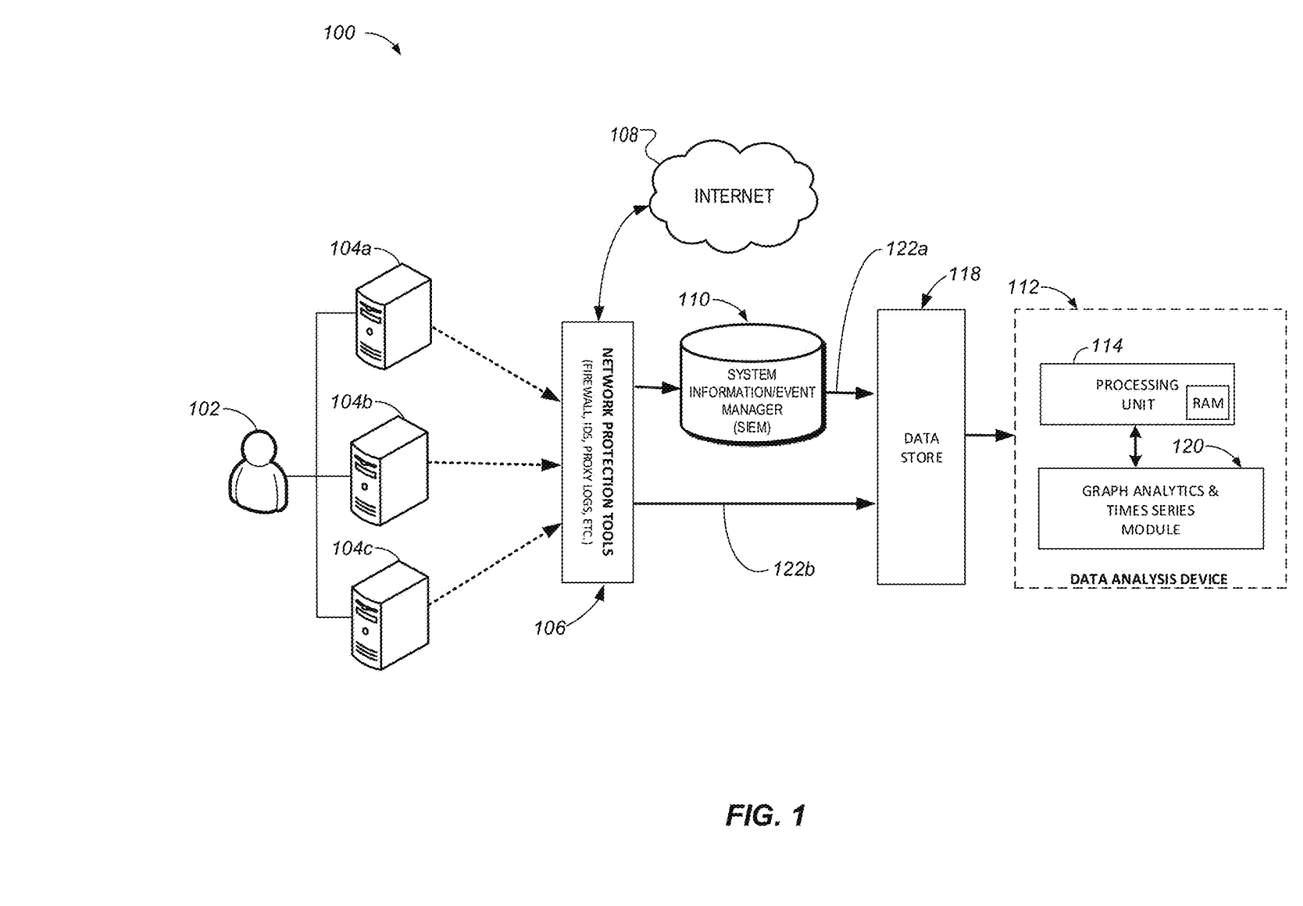
FIG. 1 illustrates a block diagram of an example computing network that includes an example data analysis device.

FIG. 1 illustrates a block diagram of an example computing network 100 that includes an example data analysis device. Network 100 includes computing assets 104*a/b/c*, network protection tools 106, security information event management device 110 (SIEM 110), and data analysis device 112 (hereinafter "device 112"). A user 102 interacts with computing assets 104*a/b/c*. Although a single user 102 is shown network 100 can include multiple users 102. In some implementations, computing assets 104*a/b/c* allow users 102 to engage in various computer related activities that generate data communications traffic within, and outside of, network 100. Activities may include, for example, accessing intranet sites, drafting and sending email correspondences, printing documents, accessing internet 108, and accessing shared local and external resources, such as file servers and cloud based applications.

Computing assets 104*a/b/c* can include standard laptop and desktop computers, print servers and printer/copier devices, email servers, application servers, routers, switches, intranet and related file servers, or any other computing device or asset associated with a computer network. For example, computing asset 104*a* can be a laptop/desktop computer, asset 104*b* can be an email server, and asset 104*c* can be a router. Although three computing assets 104*a/b/c* are shown in FIG. 1, in some implementations, network 100 may include more or fewer assets 104 that cooperate to enable user 102 to engage in the above-mentioned computer related activities.

As shown, computing assets 104*a/b/c* are in data communication with network protection tools 106. Protection tools 106 provide network 100 with various network security functions. Example network security functions include blocking or filtering of data packets or other data traffic from entering and/or exiting network 100. Further, example network protection tools 106 include firewalls, proxy servers, intrusion detection systems, intrusion prevention systems, packet sniffing devices, vulnerability scanning devices, or any other network security device associated with a computer network.

As discussed in more detail below, in some implementations, the one or more tools/devices that collectively form network protection tools 106 can each be designed or configured to periodically generate log data/files that include certain parameters or attributes associated with security and non-security related events or activities that occur within network 100. As shown, each log file generated by the respective devices of network protection tools 106 can be provided to device 112 through communication data path 122*b*.

As shown, the one or more tools/devices of network protection tools 106 are each in data communication with one of STEM 110 or device 112. As it relates to computer and/or network operations, STEM 110 provides collection and storage of a variety of system event data and system information data relating to computing assets 104*a/b/c*, network protection tools 106, and one or more other computing devices that, although not explicitly described, are known to be present within computer networks (i.e., network 100).

STEM 110 generates, tracks, or monitors log data related to events or information associated with computing activities that occur within network 100 (e.g., Domain Name System (DNS) traffic). Much like the devices of network protection tools 106, SIEM 110 can also be designed or configured to periodically generate log data/files including certain parameters or attributes associated with events or activities within network 100. In some implementations, SIEM 110 receives log files from each device of protection tools 106 and provides each log file to device 112 through communication data path 122*a*. In other implementations, STEM 110 receives log files from each device of protection tools 106 and aggregates each log file into a larger log file and/or correlates each log file based on common attributes associated with the files. As shown in FIG. 1, log data from STEM 110 is provided to device 112 through communication data path 122*a*.

As shown in FIG. 1, device 112 can be connected or coupled to one of SIEM 110 or network protection tools 106. In some implementations, device 112 is connected or coupled to SIEM 110 through data communications path 122*a*. Similarly, in some implementations, device 112 can be connected or coupled to network protection tools 106 through data communications path 122*b* or indirectly through STEM 110 and data communications path 122*a*. In yet another implementation, device 112 can be simultaneously coupled to both SIEM 110 through data communications path 122*a* and network protection tools 106 through either data communications path 122*b* or indirectly through STEM 110 and data communications path 122*a*.

Device 112 includes processing unit 114 and module 120. In some embodiments, processing unit 114 can include one or more processors (e.g., microprocessors or central processing units (CPUs)), graphics processing units (GPUs), application specific integrated circuits (ASICs), or a combination of different processors. In alternative embodiments, device 112 can include other computing resources/devices (e.g., cloud-based servers) that provide additional processing options for performing one or more of the determinations and calculations described in this specification.

Processing unit 114 is can include one or more memory units or memory banks. In some implementations, processing unit 114 executes programmed instructions stored in memory to cause module 120 and device 112 to perform one or more functions described in this specification. The memory of processing unit 114 can include one or more non-transitory machine-readable storage mediums. The non-transitory machine-readable storage medium can include solid-state memory, magnetic disk, and optical disk, a portable computer diskette, a random access memory (RAM), a read-only memory (ROM), an erasable programmable read-only memory (e.g., EPROM, EEPROM, or Flash memory), or any other tangible medium capable of storing information.

As noted above, network protection tools 106 and SIEM 110 each periodically generate log data/files that include certain parameters or attributes associated with security and non-security related events or activities (e.g., data communications, packet information, and/or data flow/traffic patterns) that occur within network 100. Accordingly, log data store 118 includes log files generated by network protection tools 106 and SIEM 110.

Module 120 can include certain instructional logic or program code that applies, to log data in data store 118, one or more graph analytics measures and one or more time-series analysis measures. As described in more detail below with reference to FIG. 2, module 120 of device 112 can be configured to structure log data in a graphical format, and to apply one or more graph analytic measures to the structured log data to enrich nodes based on centrality and importance measures. Module 120 can be further configured to apply time-series analysis based analytic measures to the graphical data to detect sudden and unexpected shifts or changes in the indicated importance of a particular node within network 100. Although shown in FIG. 1 as being a part of device 112, in alternative embodiments, module 120 can be a stand-alone data analysis device that executes graphical analysis and/or time-series analysis measures independent of processing unit 114.

Figure 2:
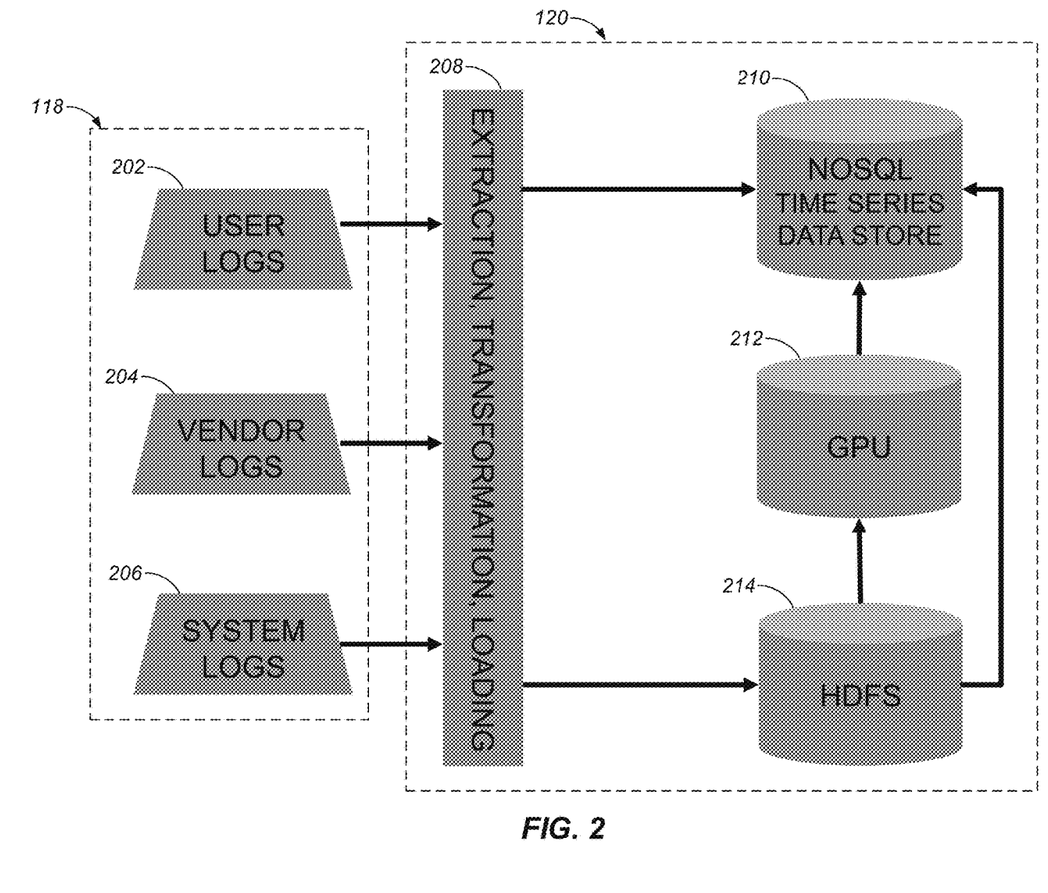
FIG. 2 illustrates a block diagram that depicts examples of one or more graph and time-series analysis features associated with the data analysis device of FIG. 1.

FIG. 2 illustrates a block diagram that depicts one or more graph analysis and time-series analysis features associated with device 112 of FIG. 1. Log data store 118 can include one or more log data types and module 120 can include one or more sub-modules. As shown, log data store 118 includes one or more log data types, such as user logs 202, vendor logs 204 and system logs 206. Further, module 120 includes an extraction, transformation, and loading (ETL) 208 sub-module, a data store sub-module 210, a graphics processing unit 212, and an hadoop distributed file system (HDFS) 214.

User logs 202 can correspond to user specific activity or events that occur within network 100. Example user events include authentications by user 102 to network 100 and/or computing assets 104a/b/c, log-in attempts by user 102 to network 100 and/or computing assets 104a/b/c, files accessed by user 102, email correspondences sent and received by user 102, or any other related user activity that typically occurs in a computer network. Vendor logs 204 and system logs 206 can be device specific log data (e.g., based on pre-configured vendor settings) generated by STEM 110 and/or by the one or more devices of network protection tools 106.

ETL 208 receives the one or more types of log data from data store 118 and performs one of an extract function, a transform function, and a load function on the received log data. In some implementations, the extract function of ETL 208 analyzes the multiple log entries in log data store 118 and extracts a desired subset of log entries. Next, the transform function of ETL 208 applies rules, using lookup tables or other related transform methods, to convert or transform the extracted subset of log entries to a desired state. Finally, the load function of ETL 208 is used to write the resulting data to a target database, such as a HDFS 214 or data store 210.

As described below, log data generated by one or more devices of network 100 can be visualized as a graph network or model, with nodes representing, for example, computing assets 104a/b/c or users 102, and edges representing, for example, specific log entries including parameters associated with network activity of certain nodes. A node of the graphical network or model is also referred to by this specification as a "vertex," and multiple nodes are referred to as "vertices." In some implementations, the parameters include, for example, the source internet protocol (IP) address of a computing asset 104 (or an asset external to network 100) sending data and a destination IP address of a computing asset 104 (or an asset external to network 100) receiving the data. The edges of the graph model can be weighted quantities of the number of log entries that include a particular source IP address and destination IP address.

GPU 212 produces a graphical model of network 100 based, at least in part, on the extracted log entries stored in HDFS 214. The extracted log entries include at least one parameter of interest that can potentially serve as an indicator of potential malicious activity occurring within network 100. A parameter associated with a certain activity or event occurring within network 100 (e.g., a parameter of interest) can be identified either automatically by module 120 or manually by an administrator or security officer that oversees management of network 100.

In some implementations, the activity/event used to select a parameter can include, for example, indications that a particular source IP address is attempting to make an outbound connection to a particular destination IP address; a particular source IP address is attempting to make a number of outbound connections that exceeds a threshold number typically attempted by that source IP address based on known activity trends; a first source IP address or computing asset 104 being connected or coupled to a second source IP address or computing asset 104 that is known to be infected with malicious program code such as a virus or malware; a particular user 102 is attempting to access or authenticate to a certain file or sub-network of network 100; or other activity associated with network 100 that involves user 102, computing asset 104, or a source/destination IP address that can be perceived as abnormal or as an indicator of one or more suspected cyber security vulnerabilities.

In some implementations, producing a graphical model of network 100 includes performing, by module 120, a periodic log data update that comprises point-in-time partitioning (PTP). In performing PTP, for each new update of extracted log entries (corresponding to a past time window) provided to HDFS 214, the past time window of data is collected/received by HDFS 214 and a new set of graph analytics metrics are calculated, by GPU 212, and stored in data store 210. In some implementations, the graphical model or analytic metric sets are stored in data store 210 as at least one of an adjacency matrix and a compressed sparse matrix. The update rate corresponding to how often graph analytic calculations are performed for each time window can vary depending on administrator preference. Each graph analytic calculation produces a set of graph analytic metrics associated with a particular node/parameter (e.g., user ID for user 102, source IP address, destination IP address, source user ID, or destination user ID) for network 100.

In some examples, module 120 can be configured to have an hourly update rate such that GPU 212 calculates a new or subsequent set of graph analytic metrics every hour. Update rates may vary and can be hourly, daily, weekly or any other rate desired by an administer of network 100. The past time window corresponds to the size (e.g., in time—one day, two days, five days, etc.) of the time window that is used for the graph analytic calculations. In some implementations, module 120 can be configured to have a past time window of two days, whereby extracted log entries provided to GPU 212 correspond to network activity logs that have occurred in the past two days. Much like the update rate, the past time window can also vary depending on administrator preference.

Module 120 can include one or more enrichment functions associated with graph analytic measures performed by GPU 212. In some implementations, enrichment functions are applied to extracted log entries to parse, for each log entry, a time attribute associated with a particular network activity (e.g., sending or receiving data traffic/packets) of one or more nodes in network 100. Moreover, corresponding graph analytic measures at the parsed point in time can be enriched for a source node/IP address and a destination node/IP address associated with the network activity. In some examples, and as discussed above, enrichment of a time attribute can include parsing a time attribute (11 am EST) for a past time window of log entries (past two days of log entries) and analyzing the contents of the log entries for a particular node or parameter over the past time window.

Graph analysis/analytic measures can include at least one of a PageRank measure, a between-ness centrality measure, a triangle count measure, or one or more other graph analytic measures configured to analyze a reoccurring characteristic of a node or parameter included in the log entries. With regard to computer network analysis, graph analytic measures can be used to detect indicators of centrality that identify the most important vertices (e.g., node activity/event) within a graph. Applications can include identifying the most active nodes in a computer network. For example, in network 100, graph analytic measures can be used to identity or detect users 102 or computing assets 104 (source/destination IP) that have engaged in network activity that exceeds a threshold level of activity (e.g., attempts to access certain files/resource above a threshold, sending/receiving data packets above a threshold, etc.).

Data store 210 is a time-series data store that includes search query functionality. In some implementations, data store 210 can be a non-structured query language (NoSQL) database that provides a mechanism for storage and retrieval of time-series data. Data store 210 is configured to receive and store time-series data associated with certain nodes of network 100. As shown in FIG. 2, data store 210 can store time-series data received from GPU 212. In some implementations, the data is produced based on time-series processing performed by GPU 212 on the one or more graph metric sets generated by GPU 212. Example time series analysis methods used by GPU 212 to produce time-series data can include, for example, a time-series regression method, an auto-regressive method, a control-chart based method, a markov jump method, or any other time-series analysis method that can be implemented, at least in part, by GPU 212.

There are multiple processing methods for generating time-series data. For example, one method involves use of a conventional time-series compute function that can be implemented using HDFS 214. As shown, after generating time-series data, HDFS 214 can then provide the generated data to NOSQL data store 210 for storage and follow-on analysis. Another method for generating time-series data includes leveraging compute functions inherent to GPU 212 by, for example, providing extracted log data to a GPU cluster, performing calculations/computations to generate the time series data, and then storing the generated data in NOSQL data store 210. In alternative implementations, time-series data can be generated based, at least in part, on computations performed on log data by ETL 208. Thus, data store 210 can receive log entries including parameters associated with a computer network event that are generated after application of the one or more functions of ETL 208. Application of time-series analysis methods is distinct from the process of generating time-series analysis data. Hence, the time series analysis methods described above can be applied to the time-series analysis data stored in data store 210 to ultimately identify malicious threats to network 100.

In some examples, time-series analysis enables the use of a given time period to impose a chronological order on extracted log data entries or graph metrics associated with certain nodes of network 100. A time-series graph can include a graphical data set that orders and displays attribute values including a change in the values of an attribute or variable as time progresses. A variety of statistical studies can be performed on time-series data such as, comparing values to a baseline or threshold value. In some examples, a time-series graph can be constructed based on analysis of at least two log data parameters, in which a time/date value is at least one parameter of the at least two parameters. Date/time increments can be plotted and values associated with the other parameter or variable can be plotted relative to the date/time increments.

Accordingly, a certain parameter value corresponds to a certain date/time in a series and parameter values can be analyzed over a specified time range to detect sudden or unexpected shifts in values relative to a baseline or threshold value. Sudden or unexpected shifts in values can correspond to a rise in a relative importance of a particular node of network 100. Some nodes may demonstrate elevated importance factors that are uncharacteristic and, thus, appear abnormal with respect to a known event profile of that node. Nodes demonstrating abnormal behavior or nodes that have engaged in uncharacteristic network activity can be an indicator that the node is compromised or infected with malicious program code, such as a computer virus or malware.

In some implementations, device 112 can include false positive handling (FPH) functionality configured to reduce the number of false positive indications generated when certain nodes show an unusually high importance factor. FPH functions of device 112 can include enabling a whitelisting function that is applied to certain nodes that appear to have demonstrated uncharacteristically high importance factors. Such nodes can be identified as "known good nodes" that periodically generate sudden shifts in relative importance based on, for example, assigned jobs executed during a certain time period. Example known good nodes can include a network vulnerability scanner, an email server, a web resource server or any other computing asset 104 or user 102 (or other device) known to demonstrate an elevated importance factor due to a particular circumstance. Accordingly, FPH functions can be used to white-list certain known good nodes in order to decrease the number of network security incidents that require response, therefore reducing network administrator workload.

Figure 3:
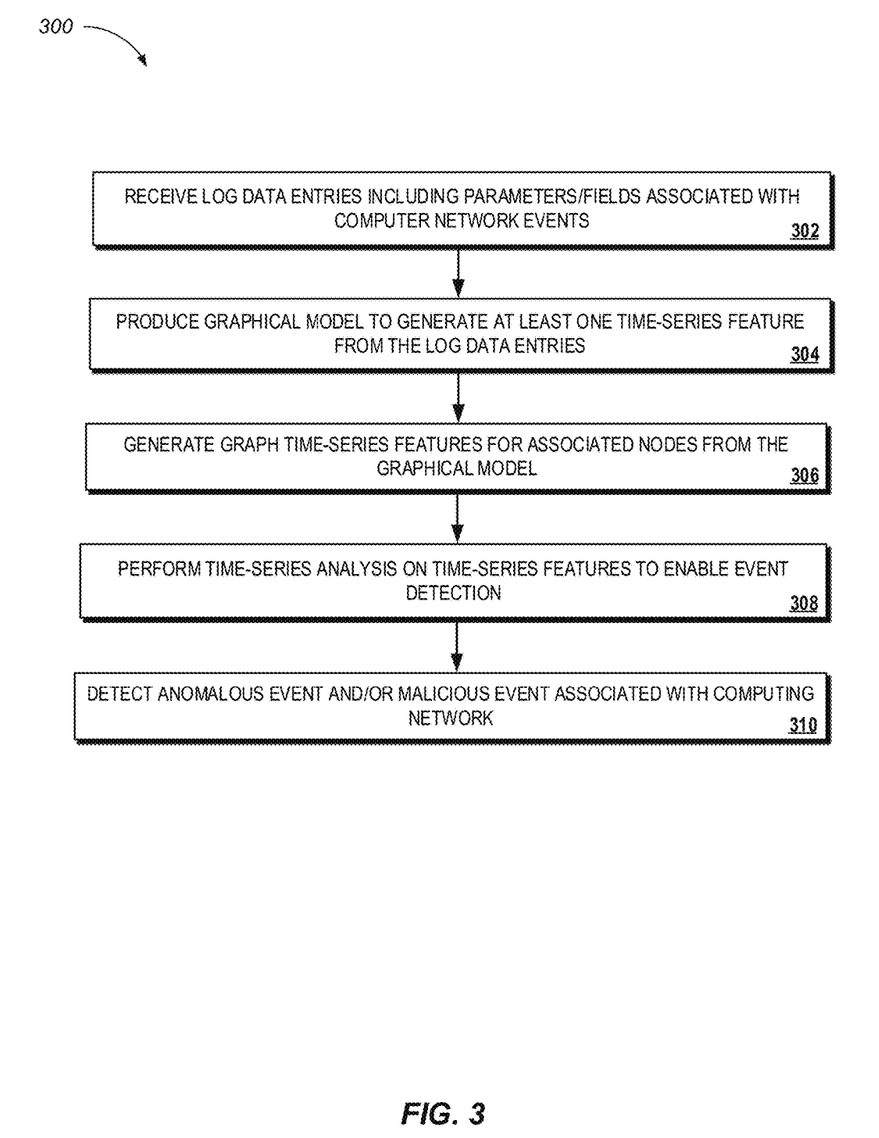
FIG. 3 illustrates a flowchart of an example process for malicious threat detection relative to the example computing network of FIG. 1.

FIG. 3 illustrates a flowchart of an example process 300 for malicious threat detection based on one or more graph analytic metrics and time-series performed on at least a subset of log data retrieved from devices associated with network 100. Process 300 begins at block 302 and includes, receiving, by device 112, log data from data store 118 including fields associated with network 100. As discussed above, fields can include, for example, nodes and time attributes. Nodes can include, for example, one of a first computing asset or source IP, a second computing asset or a destination IP, a source user, or a destination user. In some implementations, fields may correspond to computing assets, users, or IP addresses that are external to network 100. At block 304, process 300 includes module 120 of device 112 building/producing a graphical model associated with network 100 based, in part, on at least one field extracted from log entries included in log data store 118. At block 304, process 300 can further include module 120 of device 112 executing at least one of an extract, transform, or load, function (using ETL 208) on certain log entries that include one or more features of interest that are associated with a computer network event. The various functions executed by ETL 208 cause extracted log entries to be loaded into HDFS 214.

At block 306, process 300 includes module 120 of device 112 generating graph time-series features associated with the graphical model, the features also being associated with a node of a network 100. As discussed above, in some implementations, the features can be importance measures determined from graph analytic models. While in other implementations the features can be individual metrics like the number of times that a node engages in network activity within network 102 or a computing asset that is external to network 100. In some implementations, GPU 212 receives one or more extracted log entries from HDFS 214 and applies one or more graph analytic measures to produce an initial set of graph metrics for storage in time-series data store 210. Block 306, process 300 can further include GPU 212 performing point-in-time partitioning to produce at least one subsequent set of graph metrics based, in part, on a past time window. At block 308, process 300 includes module 120 performing time-series analysis on the identified time-series features. In some implementations, the features are analyzed based on prior behavior (e.g., a baseline activity profile or trend data) or an importance factor indicated by the graph analytic features generated by GPU 212.

Subsequent to the analysis, other time series features can be flagged as potential candidates for final times-series analytic models based, in part, on a contributing factor associated with a value of the feature. In some implementations, a parameter can be flagged as a candidate based on, for example, the predictive value of the parameter (e.g., log-in attempts, quantity of inbound/outbound data packets) exceeding a threshold value. A parameter can also be flagged as a binary feature based on the parameter being associated with abnormal or unusual network events. Example abnormal or unusual events can include a user 102 attempting to access a restricted file or sub-network or a computing asset 104 having a connection to a network node comprised or infected by malicious program code (e.g., malware, computer virus).

At block 310, process 300 determines or detects, based on the time-series models created on the identified parameters, at least one of an anomalous event associated with network 100 or a malicious event/threat associated with network 100. In some implementations, time-series analysis of the identified features enables detection of sudden and unexpected shifts that have occurred in a relative importance factor of a particular node or an identified feature (and the feature's value) associated with a node. In the context of network security, a malicious event or threat can be described as the occurrence of, or potential for, a nefarious user and/or computer program (e.g., malware, virus, spyware, or botnet) gaining unauthorized access to network 100 for the purpose of causing harmful or undesired effects, such as corrupting, destroying, denying access to, spying, or stealing sensitive information or data usually without a network owner's knowledge or permission.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by a data analysis device, a data file comprising multiple log data entries, the log data entries including parameters that describe a computer network event in a computing network that is under evaluation for cybersecurity purposes;
producing, using a graphics processor of the data analysis device, a graphical model of the computing network that is under evaluation for cybersecurity purposes based on at least one parameter obtained from the log data entries, wherein vertices of the graphical model each represent a computing asset, and edges of the graphical model each represent one of the multiple log data entries;
applying a graph analytic measure to the graphical model to enrich each vertex of the graphical model that represents a computing asset of the computing network that is under evaluation for cybersecurity purposes based on a respective centrality measure of the vertex that identifies vertices in the graphical model that are indicated as most central or important;
performing, using at least the graphics processor, a time-series analysis on the graphical model whose vertices have been enriched based on the centrality measures to determine a relative importance of each vertex in the computing network;
detecting, based on the times-series analysis on the graphical model, a shift of the parameter at one or more vertices of the graphical model relative to a threshold over a time series of the graphical model; and
determining, based on (i) detecting the shift of the parameter at the one or more vertices of the graphical model relative to the threshold over the time series of the graphical model and (ii) false positive handling functionality defining known good computing assets in the computing network that periodically generate sudden shifts in relative importance, whether at least one of an anomalous event associated with the computing network or a malicious event associated with the computing network has occurred.

2. The method of claim 1, wherein producing the graphical model of the computer network comprises analyzing, by a processor of the data analysis device, log data entries using one or more graph analytic (GA) measures to produce a first set of GA metrics.

3. The method of claim 2, wherein the GA measures comprise at least one of a PageRank measure, a betweenness centrality measure, a triangle count measure, or one or more graph analytic measures configured to analyze a reoccurring characteristic of the at least one parameter.

4. The method of claim 2, further comprising:
performing, by the data analysis device, a periodic log data update that comprises point-in-time partitioning by, for each update of the periodic log data update, receiving a past time window of log data entries associated with the graphical model and storing, in a data storage unit of the data analysis device, the past time window.

5. The method of claim 4, further comprising, analyzing, by the processor, the past time window of log data entries associated with the graphical model to produce a subsequent set of GA metrics, wherein the first set of GA metrics and subsequent set of GA metrics each comprise the identified parameter on which time-series analysis is performed.

6. The method of claim 4, further comprising, storing, in the data storage unit, the graphical model of the data as at least one of an adjacency matrix and a compressed sparse matrix.

7. The method of claim 1, further comprising:
extracting, by the data analysis device, the parameters associated with the computer network event and preparing the identified parameter to be loaded into a data storage unit of the data analysis device; and
wherein extracting and preparing occur in response to a processor of the data analysis device executing an instruction stored in the data storage unit, wherein the instruction comprises an extract, transform, load (ETL) data processing function.

8. The method of claim 1, wherein the parameters associated with the computer network event included in the log data entries comprise at least one of a network event type, a source identifier, or a destination identifier, and wherein the node comprises one of a computing asset or a user of a computing asset.

9. The method of claim 1, wherein performing the time-series analysis comprises performing at least a part of the time-series analysis using a graphics processing unit (GPU).

10. An electronic system comprising:
one or more processing devices; and
one or more non-transitory machine-readable storage devices storing instructions that are executable by the one or more processing devices to perform operations comprising:
receiving, by a data analysis device, a data file comprising multiple log data entries, the log data entries including parameters that describe a computer network event in a computing network that is under evaluation for cybersecurity purposes;
producing, using a graphics processor of the data analysis device, a graphical model of the computing network that is under evaluation for cybersecurity purposes based on at least one parameter obtained from the log data entries, wherein vertices of the graphical model each represent a computing asset, and edges of the graphical model each represent one of the multiple log data entries;
applying a graph analytic measure to the graphical model to enrich each vertex of the graphical model that represents a computing asset of the computing network that is under evaluation for cybersecurity purposes based on a respective centrality measure of the vertex that identifies vertices in the graphical model that are indicated as most central or important;
performing, using at least the graphics processor, a time-series analysis on the graphical model whose vertices have been enriched based on the centrality measures to determine a relative importance of each vertex in the computing network;
detecting, based on the times-series analysis on the graphical model, a shift of the parameter at one or more vertices of the graphical model relative to a threshold over a time series of the graphical model; and
determining, based on (i) detecting the shift of the parameter at the one or more vertices of the graphical model relative to the threshold over the time series of the time series analysis on the graphical model and (ii) false positive handling functionality defining known good computing assets in the computing network that periodically generate sudden shifts in relative importance, whether at least one of an anomalous event associated with the computing network or a malicious event associated with the computing network has occurred.

11. The electronic system of claim 10, wherein producing the graphical model of the computing network comprises analyzing, by a graphics processor of the electronic system, log data entries using one or more graph analytic (GA) measures to produce a first set of GA metrics.

12. The electronic system of claim 11, wherein the GA measures comprise at least one of a PageRank measure, a between-ness centrality measure, a triangle count measure, or one or more graph analytic measures configured to analyze a reoccurring characteristic of the at least one parameter.

13. The electronic system of claim 11, wherein the operations further comprise performing, using at least the graphics processor, a periodic log data update that comprises point-in-time partitioning by, for each update of the periodic log data update, receiving a past time window of log data entries associated with the graphical model and storing, in a storage device of the electronic system, the past time window of log data entries.

14. The electronic system of claim 13, wherein, operations performed by the electronic system further comprises, analyzing, by the graphics processor, the past time window of log data entries associated with the graphical model to produce a subsequent set of GA metrics, wherein the first set of GA metrics and subsequent set of GA metrics each comprise the identified parameter on which time-series analysis is performed.

15. The electronic system of claim 10, wherein, operations performed by the electronic system further comprises extracting the parameters associated with the computer network event and preparing the identified parameter to be loaded into a storage device of the electronic system; and
wherein extracting and preparing occur in response to a processor of the data analysis device executing an instruction stored in the data storage unit, wherein the instruction comprises an extract, transform, load (ETL) data processing function.

16. The electronic system of claim 10, wherein the time-series analysis methods comprise at least one of a time-series regression method, an auto-regressive method, a control-chart based method, or a markov jump method.

17. A non-transitory computer storage unit disposed in a data analysis device and encoded with a computer program, the program comprising instructions that when executed by one or more processing units cause performance of operations comprising:
receiving, by a data analysis device, a data file comprising multiple log data entries, the log data entries including parameters that describe a computer network event in a computing network that is under evaluation for cybersecurity purposes;

producing, using a graphics processor of the data analysis device, a graphical model of the computing network that is under evaluation for cybersecurity purposes based on at least one parameter obtained from the log data entries, wherein vertices of the graphical model each represent a computing asset, and edges of the graphical model each represent one of the multiple log data entries;

applying a graph analytic measure to the graphical model to enrich each vertex of the graphical model that represents a computing asset of the computing network that is under evaluation for cybersecurity purposes based on a respective centrality measure of the vertex that identifies vertices in the graphical model that are indicated as most central or important;

performing, using at least the graphics processor, a time-series analysis on the graphical model whose vertices have been enriched based on the centrality measures to determine a relative importance of each vertex in the computing network;

detecting, based on the times-series analysis on the graphical model, a shift of the parameter at one or more vertices of the graphical model relative to a threshold over a time series of the graphical model; and determining, based on (i) detecting the shift of the parameter at the one or more vertices of the graphical model relative to the threshold over the time series of the graphical model and (ii) false positive handling functionality defining known good computing assets in the computing network that periodically generate sudden shifts in relative importance, whether at least one of an anomalous event associated with the computing network or a malicious event associated with the computing network has occurred.

18. The non-transitory computer storage unit of claim 17, wherein producing the graphical model of the computing network comprises analyzing, by a processing unit of the data analysis device, log data entries using one or more graph analytic (GA) measures to produce a first set of GA metrics.

19. The method of claim 1, further comprising:
structuring, in a graphical data format, a subset of log data entries to produce the graphical model, the subset of log data entries including the identified parameter;

applying a graph analytic measure to the subset of log data entries to generate the times-series data that enriches the node of the computing network based on the centrality measure of the node; and detecting, based on the time-series data that enriches the node, an abrupt change in the pattern of data flow at the node, the abrupt change representing an elevated importance of the node that indicates an anomalous event in the computing network.

20. The electronic system of claim 10, wherein the operations further comprise:
structuring, in a graphical data format, a subset of log data entries to produce the graphical model, the subset of log data entries including the identified parameter;

applying a graph analytic measure to the subset of log data entries to generate the times-series data that enriches the node of the computing network based on the centrality measure of the node; and detecting, based on the time-series data that enriches the node, an abrupt change in the pattern of data flow at the node, the abrupt change representing an elevated importance of the node that indicates an anomalous event in the computing network.

* * * * *

UNITED STATES PATENT AND TRADEMARK OFFICE
CERTIFICATE OF CORRECTION

PATENT NO. : 10,476,896 B2
APPLICATION NO. : 15/264234
DATED : November 12, 2019
INVENTOR(S) : Louis William DiValentin et al.

Page 1 of 1

It is certified that error appears in the above-identified patent and that said Letters Patent is hereby corrected as shown below:

In the Claims

Column 16, Lines 10-11, Claim 10, after "of" delete "the time series analysis on".

Signed and Sealed this
Twenty-eighth Day of April, 2020

Andrei Iancu
*Director of the United States Patent and Trademark Office*